United States Patent [19]

Coogan et al.

[11] Patent Number: 5,314,942
[45] Date of Patent: May 24, 1994

[54] AQUEOUS DISPERSIONS

[75] Inventors: Richard G. Coogan; Raznik Vartan-Boghossian, both of Wilmington, Del.

[73] Assignee: ICI Americas, Inc., Wilmington, Del.

[21] Appl. No.: 85,142

[22] Filed: Jul. 2, 1993

Related U.S. Application Data

[63] Continuation of Ser. No. 900,787, Jun. 22, 1992, abandoned, which is a continuation of Ser. No. 643,701, Jan. 22, 1991, abandoned, which is a continuation of Ser. No. 244,405, Sep. 14, 1988, abandoned.

[30] Foreign Application Priority Data

Sep. 14, 1987 [GB] United Kingdom ............... 8721537

[51] Int. Cl.⁵ .................... C08J 3/02; C08K 3/20; C08L 75/00; C08G 18/10
[52] U.S. Cl. .................... 524/457; 524/507; 524/591; 524/224; 525/455; 528/66
[58] Field of Search .............. 524/457, 591, 224, 507; 525/455; 528/66

[56] References Cited

U.S. PATENT DOCUMENTS

| | | | |
|---|---|---|---|
| 3,705,164 | 12/1972 | Honig | 524/591 |
| 3,905,929 | 9/1975 | Noll | 524/839 |
| 3,920,598 | 11/1975 | Reiff | 524/871 |
| 4,190,566 | 2/1980 | Noll | 524/591 |
| 4,198,330 | 4/1980 | Kaizerman et al. | 524/513 |
| 4,318,833 | 3/1982 | Guagliardo | 524/457 |
| 4,644,030 | 2/1987 | Lowerigkeit | 524/457 |
| 4,810,751 | 3/1989 | Jellinek et al. | 524/548 |

*Primary Examiner*—Paul R. Michl
*Assistant Examiner*—P. Niland
*Attorney, Agent, or Firm*—Cushman, Darby & Cushman

[57] ABSTRACT

An aqueous polymer dispersion containing a vinyl polymer and a nonionic water-dispersible polyurethane having pendent polyoxyethylene chains, the vinyl polymer having been formed by the free radical polymerization of at least one vinyl monomer in the presence of an aqueous dispersion of the polyurethane. The dispersions are useful as coating compositions.

9 Claims, No Drawings

AQUEOUS DISPERSIONS

This is a continuation of application Ser. No. 07/900,787, filed on Jun. 22, 1992 now abandoned, which was abandoned upon the filing hereof which is a continuation of Ser. No. 07/643,701, filed Jan. 22, 1991 now abandoned which is a continuation of Ser. No. 07/244,405, filed Sep. 14, 1988 now abandoned.

This invention relates to aqueous dispersions and more particularly to aqueous dispersions containing a water-dispersible polyurethane and a vinyl polymer.

Aqueous polyurethane dispersions are well known and are used, for example, in the production of coatings and films. Dispersion of the polyurethane in the aqueous system has been achieved by the use either of external surfactants or by including appropriate ionic or nonionic groups in the polyurethane to render it self-dispersible. It has also been proposed to modify the properties of polyurethane dispersions by including vinyl polymers therein.

Thus, U.S. Pat. No. 3862074 describes coating or binding compositions which are aqueous emulsions or dispersions of one or more acrylic polymers and one or more urethane polymers, the compositions being prepared by simply blending a nonionic urethane dispersion and an acrylic dispersion. The polyurethanes used are not self-dispersible, being merely reaction products of a diamine and a polypropylene glycol based prepolymer. Consequently, thickeners and surfactants are required to keep the urethane and acrylic solids in suspension.

Nonionic polyurethanes which are water-dispersible because of the presence of poly(ethylene oxide) side chains have been described in, for example, U.S. Pat. Nos. 3905929, 3920598 and 4190566. All of these patent mention the possibility of blending aqueous dispersions of these polyurethanes with dispersions of vinyl monomers but without discussing the properties of the resulting blends.

Several patents describe processes wherein the vinyl monomer is formed in situ by polymerising one or more vinyl monomers in the presence of an aqueous polyurethane dispersion. In the processes of this type disclosed in U.S. Pat. Nos. 3705164, 4198330 and 4318833, the polyurethanes owe their water-dispersibility to the presence of anionic salt groups. EP-A-189945,(corresponding to U.S. Pat. No. 4,644,030) is also largely concerned with polymerisation of vinyl monomers in aqueous dispersions of anionic polyurethanes but also describes the use of a cationic polyurethanes and a prepolymer devoid of water-dispersing groups. A nonionic surfactant is used to disperse the latter in water.

It has now been found that compositions obtained by polymerising a vinyl monomer in an aqueous dispersion of a nonionic polyurethane having polyoxyethylene side chains possess significant advantages over urethane/vinyl polymer dispersions described in the prior art. Thus, unlike the anionic urethanes described in much of the prior art, where acid monomers will cause gelation of the dispersion, the nonionic urethanes can be used in conjunction with acrylic acid or methacrylic acid without any problems. Furthermore, compared with compositions obtained by merely blending a nonionic polyurethane dispersion with a vinyl polymer dispersion, the dispersions of the invention require no surfactants, the overall particle size is smaller, the viscosity at a given solids content is generally lower and the stability is better. Thus, unlike simple blends which may separate and form hazy films when used as coating compositions, the dispersions of the invention are highly resistant to separation and, as a result, form very clear films.

Accordingly, the invention provides an aqueous polymer dispersion containing a vinyl polymer and a nonionic water-dispersible polyurethane having pendent polyoxyethylene chains, the vinyl polymer having been formed by the free radical polymerisation of at least one vinyl monomer in the presence of an aqueous dispersion of the polyurethane.

The pendent polyoxyethylene chain content of the water-dispersible polyurethane may vary within wide limits but in all cases should be sufficient to provide the polyurethane with the required degree of water-dispersibility. The polyoxyethylene side chains may be introduced into the polyurethane by methods described in the prior art. Thus, the polyurethane forming ingredients may include one or more components having pendent polyoxyethylene chains, for example a dispersing diol and/or diisocyanate having a poly(ethylene oxide) side chain as described in U.S. Pat. No. 3905929 or U.S. Pat. No. 3920598.

In addition to the polyoxyethylene side chains, the polyurethane may contain free acid or tertiary amino groups, such groups being readily introduced into the polyurethane by including at an appropriate point in the polyurethane synthesis at least one component having at least one free acid group and at least two groups, for example hydroxyl groups, which are more reactive than the acid groups towards isocyanate groups, or at least one component having at least one tertiary amino group and at least two isocyanate reactive groups. In view of the essentially nonionic character of the polyurethane, the free acid or tertiary amino groups should not ionise to any substantial extent during storage or use of the dispersions. Particularly suitable acid groups are carboxylic acid groups. Any free acid or tertiary amino group content is suitably in the range from 5 to 180 millequivalents per 100 g.

The water-dispersible polyurethane may be linear or branched, branching being introduced by including among the polyurethane-forming components at least one component having more than two isocyanate or isocyanate reactive groups per molecule. The degree of branching may be as high as one crosslink for each 3000 atomic weight units.

Preferably, the water-dispersible polyurethane is the reaction product of:

(A) a nonionic, water-dispersible, isocyanate-terminate polyurethane prepolymer formed by reacting:
 (i) an organic polyisocyanate;
 (ii) a polymeric polyol having a molecular weight in the range 400 to 6000;
 (iii) a dispersing diol and/or diisocyanate having a pendent polyoxyethylene chain, and optionally
 (iv) an organic polyol having a molecular weight less than 400; and (B) an active hydrogen containing chain extender.

The polyisocyanate used in making the prepolymer may be an aliphatic, cycloaliphatic, araliphatic or aromatic polyisooyanate. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, 1,4-phenylene diisocyanate, 2,4-toluene diisocyanate, 2,6-toluene, diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

Organic polyols having molecular weights in the range 400-6000 which may be used in the preparation of the prepolymer particularly include diols and triols and mixtures thereof but higher functionality polyols may be used, for example as minor components in admixture with diols. The polyols may be members of any of the chemical classes of polymeric polyols used or proposed to be used in polyurethane formulations. In particular, the polyols may be polyesters, polyesteramides, polyethers, polythioethers, polycarbonates, polyacetals, polyolefins or polysiloxanes. Preferred polyol molecular weights are from 700 to 3000.

Polyester polyols which may be used include hydroxyl terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerisation of lactones, for example caprolactone, in conjunction with a polyol, may also be used. Polyesteramides may be obtained by the inclusion of aminoalcohols such as ethanolamine in polyesterification mixtures. Polyesters containing free tertiary amino groups may be obtained by including tertiary amino polyols, for example triethanolamine or N-methyl-diethanolamine, in the polyesterification reaction Polyether polyols which may be used include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyethers include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Polyethers containing free tertiary amino groups may be obtained by the oxyalkylation, for example oxypropylation, of ammonia, primary or secondary amines and amino-alcohols. Examples of suitable amines include ethylene diamine, aniline, benzylamine, toluene diamines, diaminodiphenylmethane and polymethylene polyphenyl polyamines. Suitable aminoalcohols include ethanolamine, diethanolamine, triethanolamine, N-methyldiethanolamine, bis(2-hydroxyethyl)benzylamine. In the oxyalkylation process, mixtures of amino-containing and amino-free initiators may be used if desired.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol and hexanediol with formaldehyde. Suitable polyacetals may also be prepared by polymerising cyclic acetals.

Suitable polyolefin polyols include hydroxy-terminated butadiene homo- and copolymers.

Organic polyols having molecular weights below 400 which may be used in the preparation of the prepolymer particularly include diols and triols and mixtures thereof but higher functionality polyols may be used. Examples of such lower molecular weight polyols include ethylene glycol, diethylene glycol, tetraethylene glycol, bis(hydroxyethyl) terephthalate, cyclohexane dimethanol, furan dimethanol, glycerol and the reaction products, up to molecular weight 399 of such polyols with propylene oxide and/or ethylene oxide. Tertiary amino group containing polyols such as triethanolamine, tetrakis(hydroxypropyl) ethylene diamine or the lower molecular weight oxyalkylation products of ammonia, amines and amino-alcohols may be used.

Acid groups may be introduced into the polyurethane by including dihydroxyalkanoic acids, for example 2,3-dimethylolpropionic acid, or aminocarboxylic acids, for example lysine, cystine or 3,5-diaminobenzoic acid in the prepolymer preparation.

Diols having pendent polyoxyethylene chains which may be used in the preparation of the prepolymer include those described in the prior art, for example in U.S. Pat. No. 3905929. These diols, because of their function, may be regarded as dispersing diols. Particularly suitable dispersing diols may be obtained by reacting one mole of an organic diisocyanate in which the two isocyanate groups have different reactivities with approximately one mole of a polyethylene glycol mono ether and then reacting the adduct so obtained with approximately one mole of a dialkanolamine, for example diethanolamine.

Diisocyanates having groups of different reactivity which may be used in the preparation of the dispersing diols include 2,4-toluene diisocyanate, isophorone diisocyanate and 2,4'diphenylmethane diisocyanate. Polyethylene glycol monoethers which may be used include the reaction products of ethylene oxide with monohydric alcohols such as methanol, ethanol, tertiary butanol or benzyl alcohol or phenols such as phenol itself. The polyethylene glycol monoethers suitably have molecular weights in the range 25 to 3000 and preferably in the range 500 to 2000.

If desired, the polyoxyethylene chains may contain units of other alkylene oxides in addition to the ethylene oxide units. Thus, polyoxyalkylene chains in which up to 60% of the alkylene oxide units are propylene oxide units, the remainder being ethylene oxide units, may be used.

The preparation of the dispersing diols may be achieved by adding the polyethylene glycol monoether to the diisocyanate at 20°-25° C., optionally in the presence of an inert solvent and a urethane catalyst, followed by addition of the dialkanolamine.

Diisocyanates having pendent polyoxyethylene chains which may be used in the preparation of the prepolymer include those described in the prior art, for example in U.S. Pat. No. 3920598. These diisocyanates, because of their function, may be regarded as dispersing diisocyanates. Particularly suitable dispersing diisocyanates may be obtained by reacting two moles of an organic diisocyanate in which the two isocyanate groups have different reactivities with approximately one mole of a polyethylene glycol mono-ether, the initially formed urethane monoisocyanate then reacting at a higher temperature with the excess diisocyanate to form an allophanate diisocyanate having a pendent polyoxyethylene chain.

Suitable diisocyanates and polyethylene glycol monoethers for use in preparing the dispersing diisocyanates have been mentioned above for the preparation of the dispersing diols.

The non-ionic, water-dispersible, isocyanate-terminated polyurethane prepolymer may be prepared in conventional manner by reacting a stoichiometric excess of the organic polyisocyanate with at least one organic polyol having a molecular weight in the range 62 to 6000 and the dispersing diol or diisocyanate under substantially anhydrous conditions at a temperature between about 30° C. and about 130° C. until reaction between the isocyanate groups and the hydroxyl groups is substantially complete. The polyisocyanate component and the active hydrogen containing component are suitably reacted in such proportions that the ratio of number of isocyanate groups to the number of hydroxyl groups is in the range from about 1.1:1 to about 6:1, preferably within the range of from 1.5:1 to 3:1.

If desired, catalysts such as dibutyltin dilaurate and stannous octoate may be used to assist prepolymer formation although any tertiary amino groups present in the components can be expected to have a catalytic effect. A non-reactive solvent may optionally be added before or after prepolymer formation to control the viscosity. Suitable solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone.

Other suitable solvents include vinyl monomers which are subsequently polymerised.

The aqueous polyurethane dispersions may prepared by dispersing the nonionic water-dispersible isocyanate-terminated polyurethane prepolymer in an aqueous medium and chain extending the prepolymer with an active hydrogen containing chain extender.

The prepolymer may be dispersed in water using techniques well known in the art. Preferably, the prepolymer is added to the water with agitation or, alternatively, water may be stirred into the prepolymer.

The active hydrogen containing chain extender which is reacted with the prepolymer is suitably a polyol, an amino-alcohol, ammonia, a primary or secondary aliphatic, alicyclic, aromatic, araliphatic or heterocyclic amine, especially a diamine, hydrazine or a substituted hydrazine. Water-soluble chain extenders are preferred, and water itself may be effective.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris (2-aminoethyl) amine, 3,3'-dinitrobenzidine, 4,4'-methylenebis(2-chloroaniline), 3,3'-dichloro-4,4'-bi-phenyl diamine, 2,6-diaminopyridine, 4,4'-diaminodiphenylmethane, menthane diamine, m-xylene diamine and isophorone diamine. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above. Tertiary amino group containing chain extenders which may be used include triethanolamine, N-methyldiethanolamine, bis(2-hydroxyethyl) benzylamine, bis(2-hydroxypropyl) aniline and 3,3'-diamino-N-methyldipropylamine.

Where the chain extender is other than water, for example a polyol, polyamine or hydrazine, it may be added to the aqueous dispersion of prepolymer or, alternatively, it may already be present in the aqueous medium when the prepolymer is dispersed therein.

The chain extension can be conducted at elevated, reduced or ambient temperatures. Convenient temperatures are from about 5° to 95° C. or more, preferably from about 10° to about 45° C.

The amount of chain extender employed should be approximately equivalent to the free-NCO groups in the prepolymer, the ratio of active hydrogens in the chain extender to NCO groups in the prepolymer preferably being in the range from 1.0 to 2.0:1. Of course, when water is employed as the chain extender, these ratios will not be applicable since the water, functioning both as chain extender and dispersing medium, will be present in a gross excess relative to the free-NCO groups.

The aqueous polymer dispersions of the invention may be prepared by subjecting one or more vinyl monomers to free radical polymerisation conditions in the presence of the polyurethane dispersion using conventional polymerisation techniques. Thus, free radical initiators may be added to a mixture of polyurethane dispersion and vinyl monomer or, alternatively, monomer may be added gradually to polyurethane dispersion containing initiator.

Vinyl monomers which may be polymerised to form the vinyl polymer component of the aqueous dispersions of the invention include any radically polymerisable olefinically unsaturated compounds or mixtures thereof. Thus, there may be mentioned hydrocarbon monomers, for example butadiene, isoprene, styrene, and divinylbenzene, acrylic and substituted acrylic monomers, for example acrylic and methacrylic acids, acrylonitrile, methyl, ethyl, butyl, isobutyl and 2-ethylhexyl acrylates and methacrylates, acrylamide, methacrylamide, N-methylolacrylamide and other commonly used monomers such as vinyl esters, vinyl ethers, vinyl ketones and heterocyclic vinyl compounds.

Suitable free radical initiators include mixtures partitioning between the aqueous and organic phases, for example a combination of t-butylhydroperoxide, isoascorbic acid and Fe.EDTA.

The weight ratio of polyurethane to vinyl polymer in the dispersions of the invention is suitably in the range from 9:1 to 1:9.

The aqueous dispersions of the invention may be advantageously employed as coating compositions, for which purpose they may be further diluted with water and/or organic solvents, or they may be supplied in more concentrated form by evaporation of water and/or organic components of the liquid medium. As coating compositions, they may be applied to any substrate including wood, metals, glass, cloth, leather, paper, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently. It is possible to include an amount of an antimony oxide in the dispersions to enhance the fire retardant properties. The dispersions may also be used as adhesives for materials such as polypropylene, polyester, polyurethane, leather and the like or as binding agents for various particulate materials.

The dispersions, which suitably have solids contents of from about 20 to 60% by weight, preferably from about 25 to 40% by weight, are stable over a wide pH range and are substantially unaffected by electrolytes.

Those aqueous dispersions which are derived from polyurethanes containing free acid or tertiary amino groups provide coatings and other products which can be reacted with appropriate crosslinking agents in order to modify their properties.

Thus, products containing free acid groups, for example —COOH groups, can be reacted with melamines, isocyanates, carbodiimides, aziridines, epoxides or polyvalent metal ions, for example aluminium, magnesium, barium, beryllium, cobalt, lead, copper or antimony and especially zinc, zirconium or calcium. Similarly, products containing free tertiary amino groups may be reacted with polyhalogenated hydrocarbons so as to quaternise the amino groups. Suitable polyhalogenated hydrocarbons include $\alpha,\alpha'$-dichloro-1,4-xylene, $\alpha,\alpha'$-dichloro-1,2-xylene, 1,5-dibromopentane and 1,4-dibromobutane. The crosslinking reactions can take place at room temperature or can be accelerated by heat. The crosslinked polymers are thermoset in nature and have a high degree of solvent resistance.

The invention is illustrated but not limited by the following Examples:

EXAMPLE 1

A nonionic urethane prepolymer was prepared using the following amounts:

| | |
|---|---|
| Polypropylene glycol | 136.7 g |
| Dimethylolpropionic acid | 36.0 g |
| N-Methylpyrrolidone | 219.7 g |
| Dispersing diol | 164.2 g |
| Dibutyltin dilaurate | 1.1 g |
| Isophorone diisocyanate | 177.8 g |

The system was mixed and heated to 65° C. for four hours until the NCO % dropped to 3.33%. A dispersion was prepared by pouring 100 g of the prepolymer into 99.5 g of water containing 7.53 g of 16% hydrazine. A dispersion was obtained with a pH of 4.67, solids of 32% and a viscosity of 120 cps.

The nonionic urethane was converted into a urethane acrylic copolymer using a seed-feed technique listed below. A 1000 ml reactor under nitrogen was charged as follows: 500 g of nonionic urethane dispersion, 200 g of water, 50 g of 10% sodium lauryl sulfonate, 3.0 g of 1% Fe . EDTA solution, 1.0 g of triethylene tetramine. 15.9 g of butyl acrylate, 31.8 g of methyl methacrylate and 5.3 g of methacrylic acid. The system was initiated with 10 g of a 3.5% solution of t-Butylhydroperoxide and 10 g of 1% isoascorbic acid. After the reaction exotherm was complete another 10.7 g of methacrylic acid, 64.0 g of methyl methacrylate and 32.0 g of butyl acrylate were added via a dropping funnel. Another addition of 10 g of 3.5% t-Butylhydroperoxide and 1% isoascorbic acid was added.

The copolymer had an urethane-acrylic ratio of 1:1, a pH of 6.5, viscosity of 76 cps and solids of 33.6%.

The dispersing diol used in this example was prepared as follows:

500 g of Methoxycarbowax 750 dissolved in 150 g of N-Methylpyrrolidone was added to 127.6 g of 2,4-toluene diisocyanate over a thirty minute period at 30°–35° C. At the end of the reaction, the isocyanate content was 3.65%. The system was cooled to 25° C. and 62 g of diethanol amine was added over a thirty minute period. The diol had an OH number of 109.

EXAMPLE 2

A nonionic urethane was prepared as described in Example 1 except the following amounts were used:

| | |
|---|---|
| Polypropylene glycol (M.W. = 1058) | 672.6 g |
| Dispersing diol (80% by weight solution in N-methylpyrrolidone) (M.W. = 1029) | 625 g |
| Isophorone diisocyanate | 400 g |
| N-Methylpyrrolidone | 723.4 g |
| Dibutyltin dilaurate | 3.0 g |
| Water | 2303 g |
| 16% Hydrazine | 106 g |

A nonionic urethane acrylic copolymer was prepared as described in Example 1 except the following amounts were used:

| | |
|---|---|
| Nonionic urethane dispersion | 500 g |
| Water | 200 g |
| 10% Sodium lauryl sulfonate | 50 g |
| 1% Fe.EDTA | 3.0 g |
| Triethylene tetramine | 1.0 g |
| Isobutyl acrylate | 83.3 g |
| 2-Ethylhexyl acrylate | 33.3 g |
| Butylmethacrylate | 13.3 g |
| Acrylic Acid | 3.3 g |
| 3.5% t-Butylhydroperoxide | 10 g |
| 1% Isoascorbic Acid | 12 g |
| Isobutyl acrylate | 41.6 g |
| 2-Ethylhexyl acrylate | 16.6 g |
| Butylmethacrylate | 6.6 g |
| Acrylic Acid | 1.7 g |
| 3.5% t-Butylhydroperoxide | 10 g |
| 1% Isoascorbic Acid | 12 g |

A dispersion was obtained with a urethane:acrylic ratio of 40:60, and a solids content of 42.8%.

EXAMPLE 3

A nonionic urethane-acrylic copolymer was prepared using the urethane synthesized in Example 2. A batch technique instead of a seed-feed procedure was used to prepare the copolymer.

Nonionic Urethane Dispersion from

| Example 2 | 500 g |
|---|---|
| Water | 200 g |
| 10% Sodium Lauryl Sulfonate | 25 g |
| 1% Fe.EDTA | 2.5 g |
| Triethylene tetramine | 0.5 g |
| Butyl acrylate | 126.2 g |
| 2-Ethylhexyl acrylate | 41.2 g |
| 3.5% t-BHPO | 10 g |
| 1% Isoascorbic Acid | 10 g |
| 3.5% t-BHPO | 10 g |
| 1% isoascorbic acid | 10 g |

EXAMPLE 4

A urethane prepolymer and dispersion was prepared using the following amounts. The procedure was the same as in Example 1, except that acrylonitrile was used in place of some of the N-methyl pyrrolidone.

| Polytetramethylene diol (M.W. = 1000) | 564.7 g |
|---|---|
| Dispersing Diol (80% Solids) | 657 g |
| 1,4-Cyclohexane dimethanol | 150 g |
| 80:20 Toluene diisocyanate | 545 g |
| Acrylonitrile | 217 g |
| N-Methyl pyrrolidone | 266 g |
| Methylethylketone | 124 g |
| $H_2O$ | 242 g |
| 16% Hydrazine | 17.7 g |
| Viscosity | 84 g |
| Solids, % | 35 g |

The urethane acrylic copolymer was prepared similar to Example 1 using seed-feed technique. The amounts used are listed below:

| Nonionic Polyurethane Dispersion | 1000 g |
|---|---|
| Water | 200 g |
| 10% Sodium Lauryl Sulfonate | 50 g |
| 1% Fe.EDTA | 6.0 g |
| Triethylene tetramine | 2.0 g |
| Monomer blend* | 35.0 g |
| 3.5% t-Butylhydroperoxide | 20 g |
| 1% Isoascorbic Acid | 22 g |
| Monomer blend* (1 hr. feed) | 315 g |
| 3.5% t-Butylhydroperoxide (1 hr. feed) | 44 g |
| 1% Isoascorbic Acid (1 hr. feed) | 44 g |
| Viscosity | 90 cps |
| Solids | 41% |

*Monomer blend ratio: Butyl acrylate:Acrylonitrile:Styrene:Methyl methacrylate 15.4:12.0:43.4:29.1

EXAMPLE 5A

A urethane prepolymer and dispersion was prepared using the following amounts:

| Polytetramethylene glycol 1000 | 240.8 g |
|---|---|
| Dispersing diol from Example 1 | 155.4 g |
| N-Methylpyrrolidone | 250.0 g |
| Dimethylolpropionic acid | 12.4 g |
| Isophorone diisocyanate | 173.1 g |
| Dibutyltin dilaurate | 1.6 g |

The system was mixed and heated to 70°–75° C. for four hours until the NCO % dropped to 2.90. A dispersion was prepared by feeding 800 g of the prepolymer into 770 g of deionized water containing 54.6 g of 16% hydrazine. A dispersion was obtained with the pH of 4.9, solids of 35% and a viscosity of 69 cps.

The following nonionic urethane acrylic copolymers were prepared similar to Example 1 except that the following amounts were used:

|  | Example 5B | Example 5C | Example 5D |
|---|---|---|---|
| Nonionic urethane dispersion | 500 | 500 | 500 |
| Water | 2000 | 1750 | 1750 |
| 10% Sodium Lauryl Sulfonate | 20 | — | — |
| 1% Fe.EDTA | 3.0 | 3.0 | 3.0 |
| Triethylene tetramine | 1.0 | 1.0 | 1.0 |
| Butyl acrylate | 115 | 115 | 167 |
| Methyl methacrylate | 115 | 115 | 67 |
| Methacrylic Acid | 5 | 5 | — |
| 3.5% t-Butylhydroperoxide | 10 | 10 | 10 |
| 1% Isoascorbic Acid | 12 | 12 | 12 |
| Butyl acrylate | 228 | 228 | 333 |
| Methyl methacrylate | 228 | 228 | 133 |
| Methacrylic Acid | 9 | 9 | — |
| 3.5% t-Butylhydroperoxide | 10 | 10 | 10 |
| 1% Isoascorbic Acid | 12 | 12 | 12 |
| % Solids | 27 | 30 | 30 |
| Viscosity/cps | 11 | 170 | 18 |
| pH | 7.9 | 7.5 | 9.9 |

Dispersions were obtained with a urethane:acrylic ratio of 20:80.

We claim:

1. A non-gelled aqueous polymer dispersion containing a vinyl polymer and a nonionically-stabilised water-dispersible polyurethane having pendent polyoxyethylene chains, wherein the polyurethane is self-dispersible in water by virtue of said pendent nonionic polyoxyethylene chains, the vinyl polymer having been formed by the free radical polymerisation of at least one vinyl monomer in the presence of an aqueous dispersion of the polyurethane, and wherein further said at least one vinyl monomer includes a carboxylic acid functional monomer, and the weight ratio of polyurethane to vinyl polymer is within the range from 9:1 to 1:9.

2. A dispersion according to claim 1 wherein the polyurethane has a free carboxylic acid or tertiary amino group content in the range from 5 to 180 milliequivalents per 100 g.

3. A dispersion according to claim 1 wherein the polyurethane has a degree of branching of up to one crosslink for each 3000 atomic weight units.

4. A dispersion according to claim 1 wherein the water-dispersible polyurethane is the reaction product of:
   (A) a nonionically stabilized, water-dispersible, isocyanate-terminated polyurethane prepolymer formed by reacting:
      (i) an organic polyisocyanate;
      (ii) a polymeric polyol having a molecular weight in the range of 400 to 6000; and
      (iii) a dispersing diol and/or diisocyanate having a pendent polyoxyethylene chain; and
   (B) an active hydrogen containing chain extender.

5. A dispersion according to claim 4 wherein the polymeric polyol is a polyether diol having a molecular weight in the range from 700 to 3000.

6. A dispersion according to claim 4 wherein the dispersing diol is a product obtained by reacting one mole of an organic diisocyanate in which the two isocyanate groups have different reactivities with approximately one mole of a polyethylene glycol monoether and then reacting the adduct so obtained with approximately one mole of a dialkanolamine.

7. A coating or film derived from an aqueous dispersion as claimed in claim 1.

8. A composite article which includes a film as claimed in claim 7 as an adhesive layer.

9. A dispersion according to claim 4 wherein an organic polyol having a molecular weight less than 400 is also used as a reactant (iv) to form (A).

* * * * *